Figure 1:
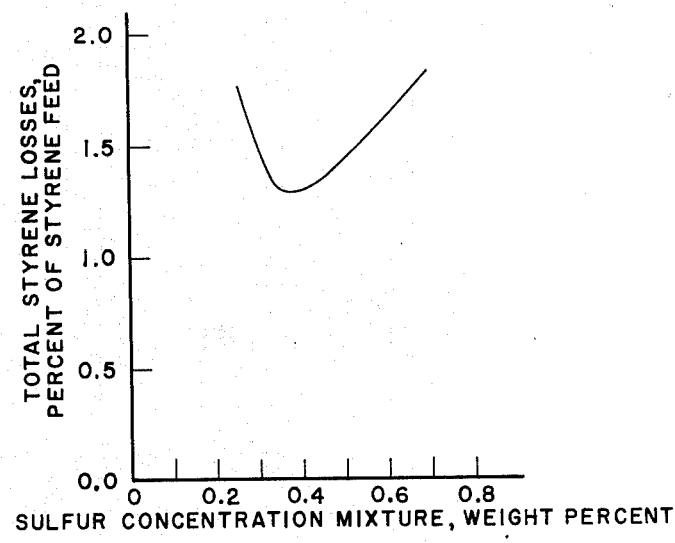

Dec. 7, 1965  D. N. CAMPBELL  3,222,263
INHIBITING THE POLYMERIZATION OF VINYL AROMATIC HYDROCARBONS
Filed July 23, 1962  3 Sheets-Sheet 1

INVENTOR
Dan N. Campbell

BY *C. Ray Holbrook Jr.*
ATTORNEY

Dec. 7, 1965     D. N. CAMPBELL     3,222,263
INHIBITING THE POLYMERIZATION OF VINYL AROMATIC HYDROCARBONS
Filed July 23, 1962     3 Sheets-Sheet 3

INVENTOR
Dan N. Campbell

BY *C. Ray Holbrook Jr.*
ATTORNEY

United States Patent Office 3,222,263
Patented Dec. 7, 1965

3,222,263
INHIBITING THE POLYMERIZATION OF VINYL AROMATIC HYDROCARBONS
Dan N. Campbell, Texas City, Tex., assignor to Monsanto Company, a corporation of Delaware
Filed July 23, 1962, Ser. No. 211,595
8 Claims. (Cl. 202—57)

This invention concerns an improved method for inhibiting the polymerization of vinyl aromatic hydrocarbons during distillation. More particularly, this application is concerned with a process for the introduction of a polymerization inhibitor into a vinyl-aromatic-hydrocarbon-containing mixture so that effective inhibition of polymerization is obtained during the distillation operation. This invention is specifically related to a novel method for introducing inhibitor into a styrene distillation system to prevent the polymerization of styrene.

It is well-known that styrene, either alone or together with alkylated aromatic hydrocarbons such as ethylbenzene, tends to polymerize to a considerable extent upon standing for periods of time or upon exposure to elevated temperatures. In the manufacture of styrene and other vinyl aromatic hydrocarbons, yield losses of styrene and equipment stoppages are encountered because of this tendency to polymerize when undergoing separation from ethylbenzene or other hydrocarbons by distillation. In order to minimize styrene losses from polymerization, it is the usual practice to add to the mixture containing styrene prior to the distillation step certain compounds such as quinone, trinitrobenzene, selenium, arsenic trisulfide, aluminum sulfide, copper nitrate, tertiary-butyl catechol, or granulated sulfur to inhibit this polymerization. Most of these compounds inhibit the polymerization to some extent but nevertheless considerable polymerization occurs at the elevated temperatures used in a distillation system for the separation of, for instance, styrene from ethylbenzene.

In the case of granulated sulfur, the polymerization of styrene during the distillation process is effectively inhibited if considerable quantities of sulfur are always present. However, under these conditions, by-products of styrene and sulfur are formed and additional losses of styrene must be tolerated. Furthermore, when granulated sulfur is employed, the control problems inherent in the introduction system are so serious that periods of insufficient sulfur are unavoidable and polymerization occurs with accompanying styrene losses. This lack of control is the most serious drawback to the use of granulated sulfur because the cycling between excessive sulfur in the styrene-containing mixture to the distillation system and insufficient sulfur cause losses of styrene monomer at both extremes of sulfur concentration.

In the usual and ordinary method for inhibiting the polymerization of styrene when separating styrene from ethylbenzene by distillation, solid granulated sulfur may be added to the distillation column by passing the distillation column overhead sidestream through a receptacle filled with the sulfur. A portion of the sulfur is dissolved by the distillation column overhead sidestream and that stream then joins the main distillation column reflux which is introduced back into the distillation column. Another commonly employed method of introducing granulated sulfur into the distillation system is to pass a sidestream of the mixture containing styrene, ethylbenzene and benzene through a receptacle containing solid granulated sulfur thereby dissolving a portion of the sulfur into the sidestream which then joins the main stream entering the first distillation column of the styrene purification system.

The major disadvantage of the two methods of sulfur addition described above is that the amount of sulfur dissolved in the organic material varies over an extremely wide range depending upon the quantity of sulfur in the receptacle at any given time. Another disadvantage is the changing degree of solubility which the sulfur may have in the styrene-containing mixture or the distillation column overhead at any given time depending upon the granulated state of the sulfur, the composition of the organic liquid and the temperature of the organic stream. These factors result in a wide fluctuation of the sulfur concentration in the distillation columns with a resultant loss of styrene regardless of whether the sulfur concentration is too low or too high. Excess sulfur causes losses in the form of sulfur-styrene compounds and insufficient sulfur causes styrene polymerization to occur.

Figure 2:
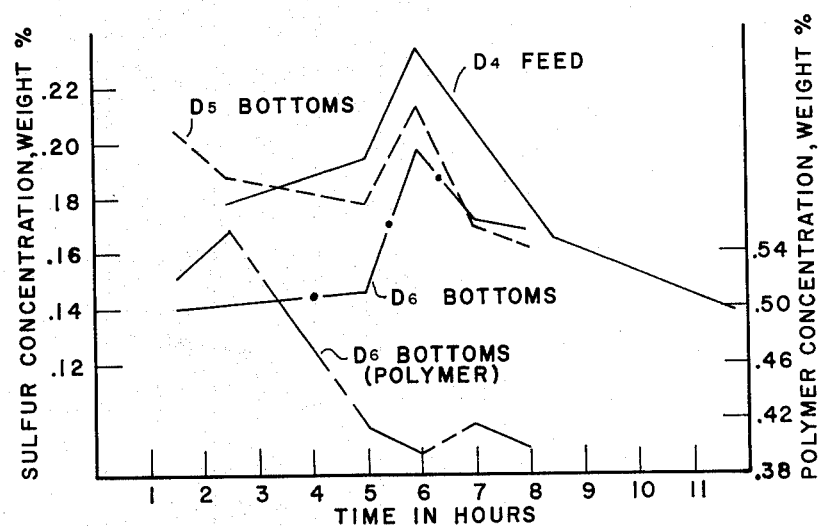

FIGURES 1 and 2 of the accompanying drawings show the difficulties of the prior art.

FIGURE 1 is a plot of the total styrene monomer losses versus the concentration of sulfur in a mixture consisting of 50% styrene and 50% ethylbenzene. FIGURE 2 indicates in a coordinate graph the variation in sulfur concentration and the variation in polymer rate versus time from actual plant samples when granulated sulfur has been added in the usual manner for a period of time.

In FIGURE 1, the plot of total styrene losses versus the sulfur concentration in a styrene-containing mixture clearly shows the criticality of the proper concentration of sulfur in the styrene-containing mixture to be distilled in order to eliminate or minimize styrene losses caused by excessive sulfur as well as styrene polymerized because of insufficient sulfur. Styrene losses are from polymerization, styrene-sulfur reaction compounds, and monomer losses. For the particular temperature and residence time used to obtain the plant data plotted in FIGURE 2, a sulfur concentration of approximately 0.3% to 0.4% by weight is preferred.

The data plotted in FIGURE 2 shows the variation in the concentration of sulfur at various points in the distillation system when introducing sulfur into the styrene-containing mixture by the usual and ordinary method of maintaining a vessel of granulated sulfur through which a sidestream of the said mixture is circulated to dissolve the sulfur. FIGURE 2 also indicates the variation in the rate of polymerization in the bottoms of one of the distillation columns due to the variation in sulfur concentration.

In the production of styrene and other vinyl aromatic hydrocarbons, it has been discovered that improved inhibition of the monomer polymerization in the distillation column reboilers and the distillation columns themselves can be accomplished by the precisely controlled addition of sulfur in a molten state. From an examination of FIGURE 1, it is clear to those skilled in the art that the unexpected discovery of losses occurring at excessive sulfur concentrations, as well as at insufficient sulfur concentration, necessitates an addition system for introducing inhibitor that will deliver a constant rate of effective inhibitor at all times. By the novel addition method described hereafter and the use of molten sulfur, the optimum quantity of inhibitor can be introduced into a vinyl aromatic hydrocarbon distillation system.

The object, therefore, of the present invention is to provide a process for the precisely controlled addition of polymerization inhibitor into a distillation system wherein vinyl aromatic hydrocarbons are being separated from a mixture containing said vinyl aromatic hydrocarbons. Another object of the invention is to provide a process for the controlled introduction of polymerization inhibitor into a styrene-containing mixture so that the losses of styrene are minimized in a process for the recovery of styrene by distillation. A still further object of this invention is to provide a method for the introduction of a liquid polymerization inhibitor into a styrene-containing mixture in such a manner that the concentration of inhibitor is substantially constant during the recovery of styrene from said styrene-containing mixture by distillation. These and other objects of the invention will become apparent from the following description.

The above objects are accomplished in the present invention by introducing a minor amount of molten sulfur into a distillation system for the purification of a vinyl aromatic hydrocarbon, to inhibit the polymerization of said vinyl aromatic hydrocarbon.

According to a preferred embodiment of the present invention, polymerization of vinyl aromatic hydrocarbons during distillation of mixtures containing said vinyl aromatic hydrocarbons is inhibited by introducing at a constant temperature and rate, a minor amount of molten sulfur in a side-stream of said mixture to be distilled, introducing the resulting mixture into the main stream of the mixture to be distilled and thereafter distilling said mixture to separate the vinyl aromatic hydrocarbon therefrom.

The accompanying drawings illustrate the process of the present invention and clearly show its advantages and unique effectiveness.

Figure 4:
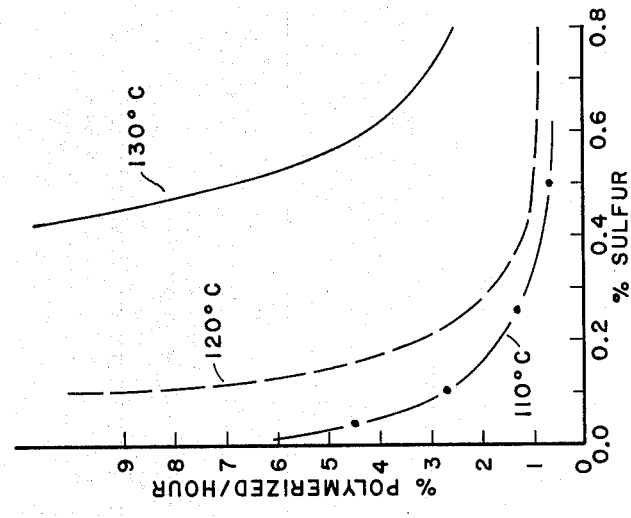
Figure 3:
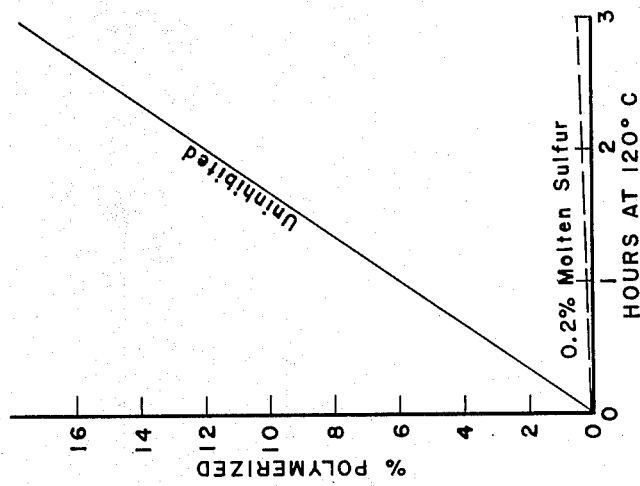
Figure 5:
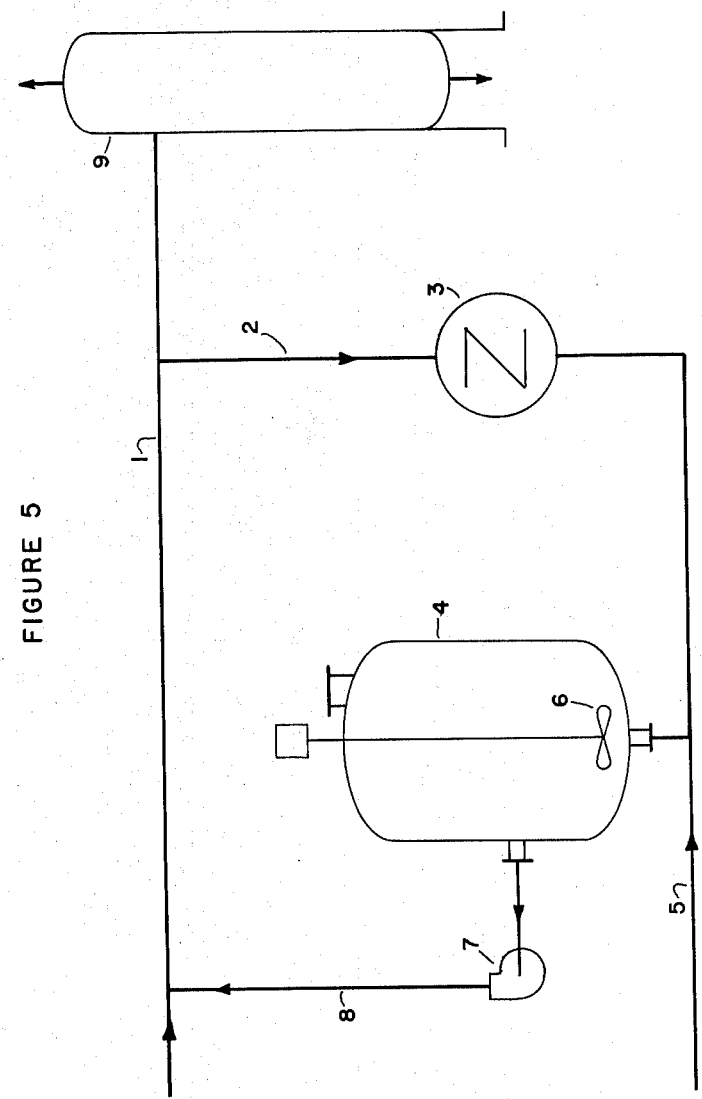

FIGURE 3 is a plot of the proportion of styrene monomer polymerized versus time at 120° C. for an uninhibited quantity of styrene and for a quantity of styrene having a concentration of 0.2% by weight of molten sulfur. FIGURE 4 is a plot of the styrene monomer polymerized versus sulfur concentration with several temperatures shown as parameters. FIGURE 5 shows a flow diagram and the equipment employed for the introduction of molten sulfur into a sidestream of a styrene-containing mixture being fed to a styrene distillation system.

FIGURE 3 is a plot of the styrene polymerization rate for uninhibited styrene and styrene inhibited with 0.2% by weight molten sulfur which demonstrates conclusively the effectiveness of molten sulfur as an inhibitor to prevent the polymerization of styrene monomer. After three hours, an uninhibited mixture of 50% ethylbenzene and 50% styrene has reached a polymerization rate of almost 18% while after three hours with 0.2% molten sulfur present, the polymerization rate is less than 0.5%.

The plot in FIGURE 4 indicates the variation in the percent styrene polymerized per hour for various concentrations of sulfur in substantially pure styrene at various temperautres. It is obvious to one skilled in the art that a temperature of approximately 120° C. or less and a sulfur concentration of about 0.2 weight percent is required to hold the styrene polymerization rate to a reasonably low value.

In FIGURE 5, the main feed stream of a styrene-containing mixture is introduced through line 1 into column 9 of the distillation system. A portion of this main feed stream is removed through line 2, heated to a constant temperature by heat exchanger 3 and then fed into sulfur vessel 4. Molten sulfur is precisely metered via line 5 into sulfur vessel 4 and is dissolved in the sidestream from line 2. The molten sulfur and sidestream mixture are continuously agitated in vessel 4 by means of agitator 6. This mixture of styrene, ethylbenzene, etc., and molten sulfur is removed from the vessel by means of pump 7 through line 8 and introduced into the main feed stream flowing through line 1 into the first distillation column 9 of the styrene distillation system.

The following examples will illustrate the invention but are not to be construed as limiting it in any manner whatsoever.

*Example I*

Two thousand seven hundred and forty parts by weight per day of hydrocarbon mixture consisting of approximately 53% ethylbenzene, 42% styrene monomer, 3% toluene, 1% benzene, and 1% oils, all by weight, were fed to a styrene distillation system over a 15-day period at a substantially constant feed rate. Granulated sulfur was added to the hydrocarbon mixture to prevent polymerization during the distillation operation. The sulfur was introduced by filling a vessel with the granulated sulfur and circulating a portion of the hydrocarbon mixture to be distilled through the vessel to dissolve the sulfur. The sidestream containing dissolved sulfur was then introduced into the main feed stream. Approximately 5.01 parts by weight per day of sulfur were added in this manner so that the average concentration of sulfur in the hydrocarbon mixture to the first distillation column was about 0.185 percent by weight. An average of 1,135 parts by weight per day of styrene monomer was recovered during this 15-day period at a yield of 98.5% based on the styrene monomer content of the hydrocarbon mixture. The quantity of styrene polymer found in the waste tar in the distillation system was determined to be an average of 18 parts by weight per day. The highest average temperature in the bottoms of the main distillation column was approximately 120° C.

*Example II*

A hydrocarbon mixture consisting of approximately 53% ethylbenzene, 42% styrene monomer, 3% toluene, 1% benzene, and 1% oils by weight was fed to a styrene distillation system over a 16-day period at a rate of approximately 2,850 parts by weight per day. Molten sulfur was introduced into the hydrocarbon mixture to be distilled by the process of this invention as shown in FIGURE 5. A 1% sidestream of the mixture was heated to approximately 120° C. and a steady stream of molten sulfur was introduced into this side-stream at a rate of 5.26 parts by weight per day. The concentrated sidestream containing dissolved molten sulfur was then introduced into the main feed stream and the total stream was fed to the first distillation column of the styrene distillation system. The sulfur introduced yielded a concentration of 0.185% by weight of the total hydrocarbon mixture. Styrene monomer was recovered during this 16-day period at an average rate of 1,185 parts by weight per day for a yield of 99.0%, based on the styrene monomer fed to the distillation system in the hydrocarbon mixture. The quantity of styrene polymer found in the waste tar was an average of 11.4 parts by weight per day. The maximum average temperature in the bottoms of the distillation system was approximately 120° C.

It will be apparent to those skilled in the art that the addition of a sufficient and constant quantity of molten sulfur into the styrene-containing mixture to the styrene distillation system will reduce the amount of styrene lost to polymer as compared with the ordinary and usual method of adding granulated sulfur by dissolving it in either the styrene-containing mixture to be distilled or the distillation column overhead as described in the prior art.

Only by introducing molten sulfur into the distillation system by a constant volume addition system can the concentration of sulfur in the distillation system be maintained at an even value which is necessary to eliminate losses of styrene due to excessive sulfur as well as losses of styrene by polymerization.

Because of its elemental nature sulfur is generally referred to as a simple substance. In reality, its molecular complexity is so great and so unique for an inorganic substance, that few elements, if any, present such interesting and fascinating characteristics. Solid sulfur exists in two crystilline forms; namely, rhombic and monoclinic. Native sulfur occurs in about 36 crystilline varieties, all belonging to the rhombic system which is the stable one at ordinary temperature. In rhombic crystals the molecules consist of 8 atoms in the form of a puckered ring. The ring consists of two squares, one turned 45° with respect to the other. On melting, however, sulfur changes its structure and becomes a straw-yellow, transparent liquid, usually denoted as lambda sulfur. At temperatures not far above the melting point, the liquid is composed entirely of octatomic molecules. It is not unexpected then to find that the effect of liquid sulfur may be different than that of solid sulfur.

Not only is the above-described method applicable to the separation of ethylbenzene from styrene, but it can also be used in the purification by distillation of other polymerizable vinyl aromatic hydrocarbons such as 4-chlorostyrene, 4-ethylstyrene, ethylvinylbenzene, divinylbenzene, vinylnaphthalene, etc. It may, of course, be employed while separating any such vinyl aromatic compounds from organic impurities therein by distillation wherein the temperatures required for separation are at least 75° C.

The amount of molten sulfur which may be added to derive the benefits of this invention varies from about 0.05% of the distillation feed stream to about 1.0% by weight. The preferred quantity, however, varies from about 0.1% to about 0.5% for economy of operation and maximum effectiveness of the inhibition.

The molten sulfur may likewise be added over a wide range of temperature. In an aromatic hydrocarbon mixture of roughly 50% ethylbenzene and 50% styrene monomer, sufficient molten sulfur will dissolve so that the process of the present invention can be operated with a sulfur temperature of from about 50° C. to about 150° C. or higher, although a higher temperature is undesirable as far as the thermal effect on the styrene itself. The preferred temperature of the molten sulfur is generally in the range from about 100° C. to about 125° C.

Although the molten sulfur was added, in the examples herein presented, to the styrene containing mixture fed to the styrene distillation system, the effectiveness demonstrated in this invention can also be realized by introducing the molten sulfur into the distillation columns or into the overhead stream from one or more of the distillation columns. It is necessary, however, that the molten sulfur be added at a point no further downstream than the distillation column used for the separation of ethylbenzene and styrene. It is possible, of course, to introduce a portion of the total amount of molten sulfur into the styrene-containing mixture fed to the first series of distillation columns and introduce the remaining portion of the desired quantity of molten sulfur into the feed stream to the ethylbenzene-styrene distillation column or into the overhead reflux stream of the ethylbenzene-styrene distillation column.

The inhibition effect of the molten sulfur in the distillation of a styrene-containing mixture to yield a substantially pure styrene monomer is effective over a wide range of distillation temperatures. Although it is generally expected that the higher the distillation temperature the greater the quantity of molten sulfur required to prevent polymerization of the styrene, the molten sulfur does have the benefit of inhibiting the polymerization over a distillation temperature range of from about 75° C. to about 150° C. In the general practice of distillation, it is preferred that the separation of styrene from ethylbenzene, for example, be carried out in the range from about 90° C. to about 120° C.

Likewise, the pressure utilized in the distillation system may be varied over any range desired without affecting the ability of the molten sulfur to prevent styrene polymerization. For example, a pressure in the range from about 1 p.s.i.a. to about 30 p.s.i.a. may be employed in the distillation columns utilizing molten sulfur to inhibit polymerization. Of course, the preferred pressure for the distillation system in the case of the recovery of styrene is generally in the range from about 5 p.s.i.a. to about 15 p.s.i.a.

What is claimed is:
1. In a process for the purification of a vinyl aromatic hydrocarbon by distillation in a distillation system, the improvement which comprises introducing a minor amount of molten sulfur into the distillation system to inhibit the polymerization of the said vinyl aromatic hydrocarbon.

2. In a process for the purification of vinyl aromatic hydrocarbons by distillation, the improvement which comprises introducing a minor amount of molten sulfur at a precisely controlled constant rate and temperature into a sidestream of a mixture containing said vinyl aromatic hydrocarbon, introducing the resulting mixture into the main stream of the mixture containing said vinyl aromatic hydrocarbon, and thereafter distilling said mixture to separate the vinyl aromatic hydrocarbon therefrom.

3. The process of claim 2 wherein the vinyl aromatic hydrocarbon is styrene.

4. The process of claim 3 wherein the concentration of molten sulfur in the distillation system based on the feed to the distillation system is from about 0.05% to 1.0% by weight.

5. The process of claim 4 wherein the temperature of the molten sulfur introduced into the distillation system is from about 50° C. to about 150° C.

6. The process of claim 4 wherein the maximum temperature in the distillation system is from about 75° C. to about 125° C.

7. In a process for the purification of vinyl aromatic hydrocarbons by subjecting a feed stream containing said vinyl aromatic hydrocarbons to distillation in a distillation system, the improvement which comprises introducing sulfur in molten form at a controlled rate in an amount from 0.05% to 1.0% by weight of said feed stream into said distillation system to thereby inhibit the polymerization of styrene without the formation of styrene-sulfur by-products.

8. In a process for the purification of styrene by subjecting styrene-containing feed stream to distillation in a distillation system, the improvement which comprises withdrawing a side stream of said feed stream, introducing sulfur in molten form into said side stream in an amount from 0.05% to 1.0% by weight of said feed stream to thereby dissolve said sulfur in said side stream, and introducing said side stream containing dissolved sulfur at a controlled rate into said distillation system to inhibit the polymerization of styrene without the formation of styrene-sulfur by-products.

References Cited by the Examiner

UNITED STATES PATENTS

| | | |
|---|---|---|
| 2,064,571 | 12/1936 | Smith. |
| 2,166,125 | 7/1939 | Britton et al. |
| 2,188,772 | 1/1940 | Dreisbach et al. |
| 2,240,764 | 5/1941 | Dreisbach et al. |
| 2,336,493 | 12/1943 | Marks. |
| 2,757,130 | 7/1956 | Burns. |

ROBERT F. BURNETT, *Primary Examiner.*

NORMAN YUDKOFF, *Examiner.*